United States Patent [19]

Longi et al.

[11] Patent Number: 4,614,727

[45] Date of Patent: * Sep. 30, 1986

[54] POLYMERIZATION CATALYST

[75] Inventors: Paolo Longi; Umberto Giannini, both of Milan; Romano Mazzocchi, Pernate, all of Italy

[73] Assignee: Montecatini Edison S.p.A., Milan, Italy

[*] Notice: The portion of the term of this patent subsequent to Nov. 26, 1991 has been disclaimed.

[21] Appl. No.: 701,530

[22] Filed: Feb. 14, 1985

Related U.S. Application Data

[63] Continuation of Ser. No. 543,520, Jan. 23, 1975, abandoned, which is a continuation of Ser. No. 322,986, Jan. 12, 1973, abandoned, which is a continuation of Ser. No. 21,196, Mar. 19, 1970, abandoned.

[51] Int. Cl.$^4$ .............................................. C08F 4/64
[52] U.S. Cl. ................................. 502/105; 502/123; 502/124; 502/134; 526/125
[58] Field of Search ................ 502/105, 134, 123, 124

[56] References Cited

U.S. PATENT DOCUMENTS

| | | | |
|---|---|---|---|
| 2,918,458 | 12/1959 | Nowlin et al. | 502/103 X |
| 2,981,725 | 4/1961 | Luft et al. | 502/134 X |
| 3,193,545 | 7/1965 | Argabright et al. | 502/124 X |
| 3,238,146 | 3/1966 | Hewett et al. | 502/201 X |
| 3,412,174 | 11/1968 | Kroll | 502/117 X |
| 3,850,842 | 11/1974 | Longi et al. | 502/105 X |
| 4,298,718 | 11/1981 | Mayr et al. | 502/105 X |
| 4,495,338 | 1/1985 | Mayr et al. | 502/105 X |

*Primary Examiner*—Patrick P. Garvin
*Attorney, Agent, or Firm*—Ellsworth H. Mosher

[57] ABSTRACT

Polymerization catalysts, more particularly catalysts for the polymerization of ethylene and mixtures thereof with other monomers copolymerizable therewith, are disclosed. The catalysts are prepared by mixing (A) an organometallic compound or hydride of a metal belonging to Groups I, II or III of the Mendelyeev Periodic Table, with (B) the reaction product of (1) a titanium compound of the type $(NR_4)_p Ti_m X_{(n.m)+p}$, in which $R_4$ is hydrogen and/or hydrocarbon radicals, $X_{n.m}$ represents halogen atoms or, in part, OR' groups in which R' is an organic radical; n represents the Ti valence, and m and p are the whole numbers 1, 2 or 3; and (2) a carrier comprising an anhydrous magnesium halide.

15 Claims, No Drawings

POLYMERIZATION CATALYST

RELATED APPLICATIONS

This application is a continuation of our prior application Ser. No. 543,520, filed Jan. 23, 1975 and now abandoned, which in turn is a continuation of our prior application Ser. No. 322,986, filed Jan. 12, 1973 and now abandoned, which in turn is a continuation of our prior application Ser. No. 21,196, filed Mar. 19, 1970 and now abandoned, all claiming priority based on Italian Application No. 14382 A/69, filed in Italy on Mar. 21, 1969.

PRIOR ART

Ethylene has been homo- and co-polymerized with the aid of catalysts prepared from titanium or vanadium compounds and organometallic compounds of metals belonging to one of Groups I to III of the Mendelyeev Periodic Table.

Our group has disclosed catalysts of very high activity in the homo- and co-polymerization of ethylene, which catalysts are prepared by mixing an organometallic compound or hydride of the Groups I to III metals with a product obtained by contacting a titanium or vanadium trihalide with a carrier comprising a preactivated anhydrous magnesium or zinc halide, or with a nonactive magnesium or zinc halide under conditions such that the magnesium or zinc halide is converted to active form.

THE PRESENT INVENTION

One object of this invention was to provide new, highly active catalysts for the homo- and co-polymerization of ethylene.

This and other objects are accomplished by the present invention in accordance with which highly active polymerization catalysts are prepared by mixing (A) an organometallic compound or hydride of the Group I to III metals with (B) the product obtained by contacting (1) a titanium compound of the formula $(NR_4)_p Ti_m X_{(n.m)+p}$ with (2) an anhydrous magnesium halide, in particular with anhydrous magnesium chloride or anhydrous magnesium bromide, either in pre-activated form or under conditions such that the magnesium halide is converted to active form.

In the formula $$(NR_4)_p Ti_m X_{(n.m)+p}$$

the valences of the quaternary nitrogen of the NR$_4$ group are satisfied by hydrogen atoms and/or by hydrocarbon groups, such as alkyl, aryl, arylalkyl and cycloalkyl groups, the nitrogen being, also, part of a heterocyclic ring; the $X_{(n.m)}$ substituents are halogen atoms or, in part, OR' groups in which R' is any organic radical such as, for instance, n-alkyl; isoalkyl; C$_6$H$_5$—; C$_6$H$_5$—CH$_2$—; C$_6$H$_{11}$—; C$_5$H$_4$N—CH$_2$—;

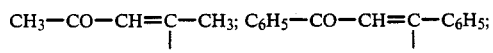

CH$_3$CO—; C$_6$H$_5$CO—; CH$_3$—O—CH$_2$—CH$_2$—; C$_6$H$_4$(OCH)—; C$_6$H$_{11}$—N(CH$_3$)—CH$_2$—; m is the valence of the titanium; and m and p are the whole numbers 1, 2 or 3.

Typical useful compounds within the stated formula are the following:

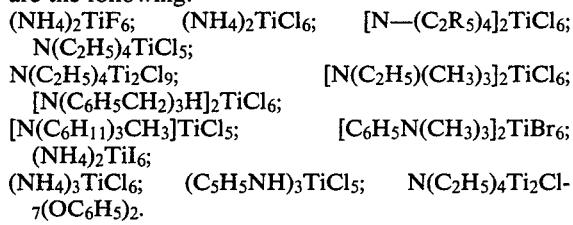

(NH$_4$)$_2$TiF$_6$; (NH$_4$)$_2$TiCl$_6$; [N—(C$_2$R$_5$)$_4$]$_2$TiCl$_6$; N(C$_2$H$_5$)$_4$TiCl$_5$;
N(C$_2$H$_5$)$_4$Ti$_2$Cl$_9$; [N(C$_2$H$_5$)(CH$_3$)$_3$]$_2$TiCl$_6$; [N(C$_6$H$_5$CH$_2$)$_3$H]$_2$TiCl$_6$;
[N(C$_6$H$_{11}$)$_3$CH$_3$]TiCl$_5$; [C$_6$H$_5$N(CH$_3$)$_3$]$_2$TiBr$_6$; (NH$_4$)$_2$TiI$_6$;
(NH$_4$)$_3$TiCl$_6$; (C$_5$H$_5$NH)$_3$TiCl$_5$; N(C$_2$H$_5$)$_4$Ti$_2$Cl$_7$(OC$_6$H$_5$)$_2$.

The catalysts of this invention thus consist of the product obtained by reacting a hydride or a metallorganic compound of the metals of Group I, II and III of the Periodic System with a product obtained by contacting a titanium-compound of the above-indicated type with a carrier consisting of or containing an anhydrous magnesium halide, in particular magnesium chloride or magnesium bromide, under conditions in which activation of the magnesium takes place, or by using the halide in a preactivated form.

By "active anhydrous magnesium halide", we intend such a halide having one or both of the following characteristics:

(A) the diffraction line in its powder X-ray spectrum corresponding to the most intense line in the spectrum for the normal inert magnesium halide is less intense and, in its place, there appears a more or less broadened halo; and (B) it (the active halide) has a surface area higher than 3 m$^2$/g, and preferably higher than 10 m$^2$/g.

The most active forms of the magnesium halides are characterized in that the X-ray spectra thereof show a broadening of the diffraction line, which is normally most intense, and/or have a surface area higher than 15 m$^2$/g.

In the case of the anhydrous magnesium chloride, the X-ray spectrum of many active forms is characterized in that the diffraction line appearing at a lattice distance (d) of 2.56 Å, and which is the most intense in the spectrum of the normal MgCl$_2$, is less intense, while in its place a broadened halo appears at a lattice distance within the range d from 2.56 to 2.95 Å.

Similarly, the X-ray spectra of many active forms of magnesium bromide are characterized in that the diffraction line at d=2.93 Å, which is the most intense in the spectrum of MgBr$_2$, is less intense, while in its place a broadened halo appears within the range of d=2.80 to 3.25 Å.

According to a preferred method, the preparation of the supported catalytic component is carried out by co-grinding the titanium compound and the anhydrous magnesium halide, for grinding times and conditions sufficient to convert the anhydrous magnesium halide into an active form having the characteristics disclosed herein. Preferably, grinding is carried out in ballmills in the absence of inert liquid diluents.

The supported catalytic component can also be prepared by simply mixing, in the solid state, the titanium compound and a preactivated anhydrous magnesium halide. Preferably, however, in the latter case, the compounds are used in suspension in an inert solvent.

Preactivated magnesium halide can be prepared in various ways. One method consists in subjecting the anhydrous halide to grinding, which can be carried out substantially under the same conditions already indicated for co-grinding the titanium compound and magnesium halide.

According to another embodiment of this invention, very active forms of magnesium halide can be obtained also by decomposing RMgX compounds (where R is a hydrocarbon radical, in particular alkyl or aryl, and X is a halogen), according to known methods or by reacting said organometallic compounds with halogenated compounds such as anhydrous gaseous hydrochloric acid.

The magnesium halides so obtained are characterized by having a surface area greater than 30–40 m$^2$/g and by showing the broadening of the highest intensity diffraction line of the normal, inert magnesium halides.

Another useful method for preparing the active magnesium halides consists in dissolving the halides in an organic solvent, such as, for example, an alcohol, ether or amine, quickly evaporating the solvent, and then completing the solvent removal by heating the halide under reduced pressure at temperatures above 100° C., and generally comprised between 100° and 400° C. According to this method, active forms of anhydrous MgCl$_2$ have been obtained from a solution of MgCl$_2$ in methanol. The surface area of the so-obtained MgCl$_2$ is higher than 20 m$^2$/g. The X-ray spectra show a broadening of the highest intensity diffraction line.

The quantity of titanium compound used in preparing the supported catalytic component may be comprised within a wide range, the lower limit of which may be, for instance, below 0.01% by weight with respect to the support, and the upper limit of which may attain values exceeding 30% by weight, and more.

Particularly interesting results, as far as the yield of the catalyst in polymer, referred both to the titanium compound and to the support, is concerned, may be obtained with quantities of titanium present on the support comprised between 1% and 10% by weight.

Hydrides and organometallic compounds particularly suited for the preparation of the present catalyst are:
Al(C$_2$H$_5$)$_3$; Al(C$_2$H$_5$)$_2$Cl; Al(iC$_4$H$_9$)$_3$; Al(iC$_4$H$_9$)$_2$Cl; Al(C$_2$H$_5$)$_3$Cl$_3$;
Al(C$_2$H$_5$)$_2$H; Al(iC$_4$H$_9$)H; Al(C$_2$H$_5$)$_2$Br; LiAl(iC$_4$H$_9$)$_4$; LiiC$_4$H$_9$.

The molar ratio between the aluminum compound and the titanium compound is not critical. When the catalyst is used in the polymerization of the ethylene, this molar ratio is preferably comprised between 50 and 1000.

The catalysts of this invention are used in the homo- and co-polymerization of the olefins according to the known techniques, that is, either in liquid phase, in the presence or absence of an inert solvent, or in the gaseous phase.

The polymerization temperature may be comprised between −80° and 200° C., but preferably is comprised between 50° and 100° C., operating either at atmospheric pressure or at increased pressure. Regulation of the molecular weight of the polymer in the course of the polymerization is obtained according to the known methods, by operating, for instance, in the presence of alkyl halides, organometallic compounds of zinc or cadmium, or of hydrogen.

As is known, the activity of conventional catalysts of the so-called Ziegler-type, obtained from the transition metals and organometallic compounds of the metals of Groups I–III of the Mendelyeev Periodic System, is considerably lowered when hydrogen or the other chain-transfer agents used for the regulation of the molecular weight are present in the polymerization system.

Surprisingly, it has been found that it is possible to regulate the molecular weight of the polymer produced with the aid of the present catalysts to low and very low values, without any appreciable decrease in the activity of the catalyst.

For instance, in the polymerization of ethylene in contact with the particularly active catalysts of this invention, it is possible to regulate the molecular weight of the polyethylene obtained within a practically useful range corresponding to intrinsic viscosities between about 1.5 and 3.0 dl/g, determined in tetralin at 135° C., without a drop in the polymer yield, to values below which it would become necessary to purify the polyethylene to free it from catalyst residues at the end of the polymerization.

The polyethylene which is obtained with the aid of the new catalysts is a substantially linear and highly crystalline polymer, with density values equal to or greater than 0.96 g/cc, having excellent processability characteristics which, in general, are better than those obtained with the normal catalysts of the Ziegler type. The titanium content in the non-purified polymer is, in general, less than 20 ppm.

The following examples are given to illustrate the invention and are not intended to be limiting. In the examples, and unless otherwise specified, the percentages given are by weight. The intrinsic viscosity of the polymer was measured, in each instance, in tetralin at 135° C.

EXAMPLE 1

0.28 g of N(CH$_3$)$_4$TiCl$_9$ (prepared according to the method described by J. A. Creighton & J. H. S. Green in *Journal Chemical Society* 808 (1968) A, for compound N(C$_2$H$_5$)$_4$Ti$_2$Cl$_9$), and 7.7 g of anhydrous MgCl$_2$ were ground in a nitrogen atmosphere for 16 hours in a glass mill (100 mm long, 50 cm diameter) containing 550 g of steel balls of 9.5 diameter. The surface area of the ground product amounted to 23 m$^2$/g.

0.06 g of the ground mixture, 2 cc of Al(i-C$_4$H$_9$)$_3$ and 1000 cc of anhydrous n-heptane were then introduced under a nitrogen atmosphere into a 2 liter stainless steel autoclave provided with a propeller stirrer and heated at a temperature of 85° C. There were then added 5 atm of hydrogen and 10 atm of ethylene and the total pressure (15 atm) was maintained constant by continuously introducing ethylene.

After 8 hours, the polymerization was stopped, the polymerization product was filtered and the polymer obtained was then dried. Thereby 500 g of polyethylene in white granules were obtained, which showed a bulk density of 0.43 g/cc and an intrinsic viscosity of 1.8 dl/g.

The yield in polymer amounted to 910,000 g/g of titanium.

EXAMPLE 2

In the previously described mill of Example 1, there were ground, for 30 hours, 0.1 g of (NH$_4$)$_2$TiCl$_6$ (prepared according to the method described by G. Bremer in "Handbuch der praparativen anorganischen Chemie", Vol. II, page 1048, edit. F. Enke Stuttgart, 1962) and 7.0 g of anhydrous MgCl$_2$.

By using 0.08 g of this mixture and carrying out the polymerization of ethylene as in Example 1, there were obtained 430 g of polyethylene with a bulk density of 0.44 g/cc and an intrinsic viscosity of 2.0 dl/g.

The yield in polymer amounted to 613,000 g/g of titanium.

EXAMPLE 3

Example 1 was repeated, except that 0.115 g of a ground mixture containing 0.62 g of $(C_5H_5NH)_3TiCl_6$ (prepared according to G. W. A. Fowles & B. J. Russ in "Journal Chemical Society", 517 (1967)A) and 7.89 g of anhydrous $MgCl_2$ was used. In this way were obtained 228 g of polyethylene having an apparent density of 0.42 g/cc and an intrinsic viscosity of 2.2 dl/g.

The yield in polymer amounted to 284,000 g/g of titanium.

EXAMPLE 4

Example 1 was repeated, except that the carrier was anhydrous $MgBr_2$ (0.22 g of $N(CH_3)_4TiCl_9$ and 4.65 g of $MgBr_2$).

With 0.016 g of this mixture were obtained 291 g of a polyethylene having a bulk density of 0.34 g/cc and an intrinsic viscosity of 1.74 dl/g.

The yield in polymer amounted to about 2,000,000 g/g of titanium.

EXAMPLE 5

In this instance, Example 1 was repeated, but with the difference that the catalyst was prepared from 0.85 g of $N(C_2H_5)_4 Ti_2Br_9$ (obtained according to the method cited in Example 1) and 5.25 g of $MgBr_2$.

Using 0.014 g of this mixture and by operating according to the procedure described in Example 1, there were obtained 78 g of a polyethylene having an intrinsic viscosity of 2.33 dl/g.

The yield in polymer amounted to 425,000 g/g of titanium.

EXAMPLE 6

Example 4 was repeated, but in this case the organometallic compound used was $Al(C_2H_5)_2Cl$ (2 cc).

From 0.013 of ground mixture there were obtained 44 g of a polyethylene having an intrinsic viscosity of 2.1 dl/g.

The yield in polymer amounted to 400,000 g/g of titanium.

EXAMPLE 7

0.40 of $N(C_2H_5)_4Ti_2Cl_7(OC_6H_5)_2$ (obtained from $N(C_2H_5)_4 Cl$ and $TiOC_6H_5Cl_3$, according to the method indicated in Example 1, found $Cl=37.18\%$ — calculated $Cl=37.55\%$; found $Ti=14.80\%$ — calculated $Ti=14.55\%$) and 10.0 g of $MgCl_2$ were ground as described in Example 1. From 0.036 g of this ground mixture were obtained 217 g of polyethylene having an intrinsic viscosity of 1.95 dl/g. The yield was 1,080,000 g/g of titanium.

EXAMPLE 8

In this instance, the procedure was as in Example 1, with the difference that the catalyst was prepared from 0.54 g of $N(CH_3)_4Ti_2Cl_9$ and 13.37 g of anhydrous $MgI_2$. By using 0.045 g of this mixture and operating according to the procedure described in Example 1, there were obtained 121 g of polyethylene having an intrinsic viscosity of 1.90 dl/g.

The yield in polymer amounted to 356,000 g/g of titanium.

EXAMPLE 9

The $MgCl_2$ used in this Example was obtained by reacting $C_2H_5MgCl$ in solution in ethyl ether with anhydrous gaseous HCl which was bubbled through the solution until $MgCl_2$ precipitated.

The $MgCl_2$ was then filtered and dried at 200° C. under vacuum.

The surface area of the product was 142 $m^2$/g and its X-ray powder spectrum showed a marked broadening of the diffraction line at $d=2.56$ Å.

7.7 g of the product thus obtained and 0.3 g of $N(CH_3)_4Ti_2Cl_9$ were introduced into a 250 cc flask fitted with a stirrer. The suspension was stirred for 1 hour at room temperature, after which the solution was evaporated.

0.065 g of this mixture was then used to polymerize ethylene according to the same conditions as those in the preceding examples.

After 2 hours, 22 g of polyethylene having an intrinsic viscosity of 2.3 dl/g were obtained.

EXAMPLE 10

The $MgCl_2$ used in this Example was obtained by rapidly evaporating the solvent from a solution of 15 g of $MgCl_2$ having a surface area of 1 $m^2$/g in $CH_3OH$, and then completing removal of the alcohol by heating the product at 300° C. under vacuum. The $MgCl_2$ thus obtained had a surface area of 32 $m^2$/g; its X-ray spectrum showed a marked broadening of the diffraction line which appears at $d=2.56$ Å in the spectrum of $MgCl_2$ of the normal, inert type.

9.25 g of said product, 0.14 g of $N(C_2H_2)_4Ti_2Cl_7(OC_6H_5)_2$, and 50 cc of n-heptane were introduced into a 250 cc flask fitted with a stirrer. The suspension was stirred for 1 hour at room temperature, after which the solvent was evaporated.

0.05 g of the resulting product was used in the polymerization of ethylene under the same conditions used in the preceding Examples, to obtain 180 g of polyethylene having an intrinsic viscosity of 2.1 dl/g.

The activity of the present catalysts is, in general, comparable to and, in some instances, more pronounced than, the activity of the catalysts prepared from catalysts obtained by mixing hydrides or organometallic compounds with a mixture of titanium trihalide and active, anhydrous zinc or magnesium halide.

While Al trisobutyl is shown as catalyst-forming component A in the illustrative examples, similar results are obtained using other organometallic compound and hydrides of aluminum, as disclosed herein.

As will be apparent, changes and variations in details can be made in practicing this invention, without departing from the spirit thereof. Therefore, we intend to include in the scope of the appended claims all such modifications, as will be obvious to those skilled in the art, from the description and working examples given herein.

What is claimed is:
1. Polymerization catalysts obtained by mixing
   (A) a catalyst-forming component which is a hydride or organometallic compound of a metal belonging to Groups I to III, inclusive, of the Mendelyeev Periodic System with
   (B) a catalyst-forming component which is the product obtained by dispersing a titanium compound having the general formula

$(NR_4)_p Ti_m X_{(n.m)+p}$ in which the Rs represent hydrogen or hydrocarbon radicals; the $X_{(n.m)}$ substituents are halogen atoms or, in part, OR' groups in which R' is an organic radical; n is the titanium valency and m and p are the whole numbers 1, 2 or 3; on a carrier essentially consisting of an anhydrous magnesium dihalide in an active form characterized in that in its X-rays spectrum the diffraction line of highest intensity that appears in the X-rays spectrum of the normal magnesium dihalide decreases in intensity and in its place a halo appears.

2. Catalysts according to claim 1, in which the total amount of titanium compound on the active magnesium dihalide carrier is from 0.01% to 30% by weight.

3. Catalysts according to claim 1, in which the total amount of titanium compound on active magnesium dihalide carrier is from 1 to 10% by weight.

4. Catalysts according to claim 1, in which component (A) is $Al(i-C_4H_9)_3$.

5. Catalysts according to claim 1, in which component (A) is $Al(C_2H_5)_2Cl$.

6. Catalysts according to claim 1, in which the magnesium dihalide is active anhydrous $MgCl_2$.

7. Catalysts according to claim 1, in which the magnesium dihalide is active anhydrous $MgBr_2$.

8. Catalysts according to claim 1, in which the titanium compound is $N(CH_3)_4Ti_2Cl_9$.

9. Catalysts according to claim 1, in which the titanium compound is $(NH_4)_2TiCl_6$.

10. Catalysts according to claim 1, in which the titanium compound is $(C_5H_5NH)_3TiCl_6$.

11. Catalysts according to claim 1, in which the titanium compound is $N(C_2H_5)_4Ti_2Br_9$.

12. Catalysts according to claim 1, in which the titanium compound is $N(C_2H_5)_4Ti_2Cl_7(OC_6H_5)_2$.

13. The method of preparing polymerization catalysts which comprises mixing
   (A) a catalyst-forming component which is a hydride or organometallic compound of a metal belonging to Groups I to III, inclusive, of the Mendelyeev Periodic System with
   (B) a catalyst-forming component which is the product obtained by co-grinding a titanium compound of the general formula $(NR_4)_p Ti_m X_{(n.m)+p}$ in which the Rs represent hydrogen or hydrocarbon radicals; the $X_{(n.m)}$ substituents are halogen atoms or, in part, OR' groups in which R' is an organic radical; n is the titanium valency and m and p are the whole numbers 1, 2 or 3; with a carrier essentially consisting of an anhydrous magnesium dihalide, until the magnesium dihalide is activated to a condition such that, in its X-rays spectrum, the diffraction line of highest intensity that appears in the X-rays spectrum of the normal magnesium dihalide decreases in intensity and, in its place, a halo appears.

14. The method of claim 13, in which the co-grinding is carried out in a ball mill in the absence of inert diluents.

15. The method of preparing polymerization catalysts which comprises mixing
   (A) a catalyst-forming component which is a hydride or organometallic compound of a metal belonging to Groups I to III, inclusive, of the Mendelyeev Periodic System with
   (B) a catalyst-forming compound which is the product obtained by co-grinding a titanium compound of the general formula $(NR_4)_p Ti_m X_{(n.m)+p}$ in which the Rs represent hydrogen or hydrocarbon radicals; the $X_{(n.m)}$ substituents are halogen atoms or, in part, OR' groups in which R' is an organic radical; n is the titanium valency and m and p are the whole numbers 1, 2 or 3; with a carrier essentially consisting of an active magnesium dihalide which is the disproportionate product of a compound of the formula RMgX, in which R is a hydrocarbon radical and X is a halogen, or the product obtained by treating said compound RMgX with a halogenated compound.

* * * * *